US012499749B2

(12) United States Patent
Schirmer et al.

(10) Patent No.: US 12,499,749 B2
(45) Date of Patent: Dec. 16, 2025

(54) FALSE ALARM DETECTION AND DIAGNOSTICS

(71) Applicant: Siemens Industry, Inc., Alpharetta, GA (US)

(72) Inventors: Dennis Schirmer, Roswell, GA (US); Tim Granzow, Emmerthal (DE); Ali Daher, Munich (DE); Ekaterina Paerschke, Vienna (AT)

(73) Assignee: Siemens Industry, Inc., Alpharetta, GA (US)

( * ) Notice: Subject to any disclaimer, the term of this patent is extended or adjusted under 35 U.S.C. 154(b) by 34 days.

(21) Appl. No.: 18/240,706

(22) Filed: Aug. 31, 2023

(65) Prior Publication Data

US 2025/0078647 A1 Mar. 6, 2025

(51) Int. Cl.
*G08B 29/02* (2006.01)

(52) U.S. Cl.
CPC .................................... *G08B 29/02* (2013.01)

(58) Field of Classification Search
CPC ....... G08B 29/02; G08B 13/08; G08B 29/185
See application file for complete search history.

(56) References Cited

U.S. PATENT DOCUMENTS

| | | | | |
|---|---|---|---|---|
| 11,578,911 | B2 * | 2/2023 | Kaemingk | F25B 49/02 |
| 12,300,091 | B2 * | 5/2025 | Schubert | G08B 29/186 |
| 2009/0051528 | A1 * | 2/2009 | Graichen | G07C 9/38 340/545.2 |
| 2019/0244492 | A1 | 8/2019 | Horgan et al. | |
| 2021/0271996 | A1 | 9/2021 | Horgan et al. | |
| 2023/0230469 | A1 * | 7/2023 | Schubert | G08B 29/185 340/506 |

* cited by examiner

*Primary Examiner* — Quan Zhen Wang
*Assistant Examiner* — Rajsheed O Black-Childress

(57) ABSTRACT

Security systems and methods thereof perform false alarm detection and diagnostics. A management station identifies at least one instance of an alarm at an access-controlled door within a predetermined time period. The management station also determines the possible root cause based on the two or more instances occurring within the predetermined time period. Each instance includes an alarm pattern including a door ok signal received from the door contact sensors and a door forced signal received from the door contact sensors subsequent to receiving the door ok signal. The door ok signal is associated with alignment of door contact sensors. The door forced signal is associated with misalignment of the door contact sensors. The door ok signal and the door forced signal correspond to the same instance. A remote device receives from the management station a notification distinguishing the possible root cause from a security hazard.

14 Claims, 4 Drawing Sheets

FALSE ALARM DETECTION AND DIAGNOSTICS

FIELD OF THE INVENTION

This application relates to the field of building management systems and, more particularly, to false alarm detection and diagnostics for a building security system.

BACKGROUND

Security organizations experience many of false alarms a day from their physical security systems. In many cases, it is difficult to know when a valid alarm has taken place and should be investigated. These "false" or "false positive" alarms are usually caused by door equipment issues due to aging, failure, or damage. Examples of such issues include access control system hardware failure or damage, network or communication loss between hardware and software, inadequate door programming, software errors, and human actions due to convenience or malintent.

In many cases, smaller organizations with limited resources and budgets have succumb to these false alarms. These organizations may ignore the alarms and miss valid security events that may present more harm than simple theft or vandalism.

For larger or more highly secure organizations, especially those that are highly regulated, "door forced" and "door held" alarms warrant human action. For example, the organization may dispatch security guards to physically respond to the location of the event and assess/confirm the alarm as well as the condition of the door. In an organization that experiences thousands of doors forced alarms a month, this results in costly and inefficient use of security resources which, in many organizations, are already stretched.

SUMMARY

In accordance with one embodiment of the disclosure, there is provided a data driven approach for detecting and diagnosing alarms of building security systems. The approach provides an efficient way to address false alarms by automating analysis, report generation, and information delivery to a responsible person, with minimal human interaction.

One aspect is a security system for false alarm detection and diagnostics comprising a management station and a remote device. The management station identifies one or more instances of an alarm at an access-controlled door within a predetermined time period. The management station also determines a possible root cause based on the two or more instances occurring within the predetermined time period and correlates the alarm pattern with door data associated with the access-controlled door, such as a remote device state and statistical data from the respective door. Each instance includes a common pattern comprising a door ok signal received from the door contact sensors and a door forced signal received from the door contact sensors subsequent to receiving the door ok signal. The door ok signal is associated with alignment of the door contact sensors. The door forced signal is associated with misalignment of the door contact sensors. The door ok signal and the door forced signal correspond to the same instance. The remote device receives a notification from the management station distinguishing the possible root cause from a security hazard and recommendations for remediation.

Another aspect is a method of a security system for false alarm detection and diagnostics and a non-transitory computer readable medium including executable instructions which, when executed, causes at least one processor to perform this method. One or more instances of an alarm at an access-controlled door are identified within a predetermined time period. Each instance includes an alarm pattern comprising receiving a door ok signal and receiving a door forced signal subsequent to receiving the door ok signal. The door ok signal is associated with alignment of door contact sensors. The door forced signal is associated with misalignment of the door contact sensors. The door ok signal and the door forced signal correspond to the same instance. A possible root cause is determined based on an occurrence of two or more instances within the predetermined time period and a correlation of the alarm pattern with door data associated with the access-controlled door. A notification is sent to a remote device distinguishing the possible root cause from a security hazard and recommendations for remediation.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
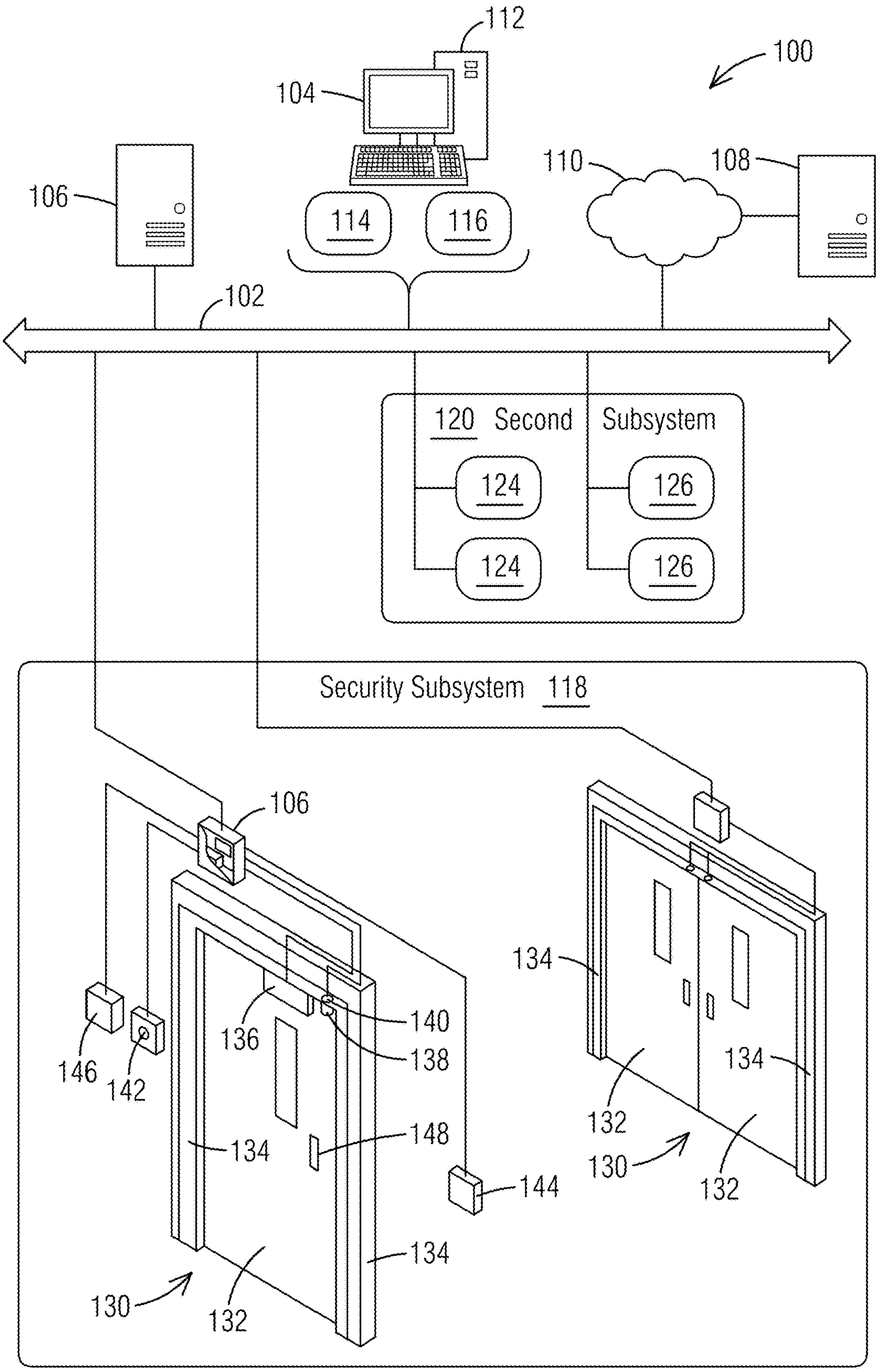
FIG. 1 is an illustration of a building management system in an example implementation that is operable to employ techniques described herein.

Various technologies that pertain to systems and methods that facilitate detection and diagnostics for building security alarms will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

The systems and methods provide an efficient way to address false alarms by automating analysis, report generation, and information delivery to a responsible person, with minimal human interaction. An example security solution for false alarm detection and diagnostics may include a network of management stations, a rule engine (processor), sync agents and remote devices. The processor ingests access control data from the sync agents for analysis and searches for specific messages and the time they were received to identify specific patterns. It may then correlate the message patterns with remote device states, software and field device configuration settings, along with door access statistical information, to identify a possible root cause for the alarm received. Possible root cause may be reported along with recommendations for remediation.

The systems and methods identify false alarms of building security systems, which distinguish from more serious security hazards. The resource and financial burdens placed on organizations are reduced. Security organizations are provided with more transparent views into the effectiveness of their operations so that they may improve to their operational efficiencies.

Referring to FIG. 1, there is shown a block diagram of the building management system ("BMS" or "system") 100 in an example implementation. The system 100 comprises one or more network connections or primary buses 102 for connectivity to components of a management level network ("MLN") of the system 100. For one embodiment, the example system 100 may comprise one or more management level devices or management stations, such as a management workstation 104, an access controller 106, or a remote access controller 108 connecting through a wired or wireless network 110, that allows the setting and/or changing of various controls of the system. A management station may also be a portable management station connecting through a wired or wireless link to an individual automation or field level device of the system 100. While a brief description of the system 100 is provided below, it will be understood that the system described herein is only one example of a particular form or configuration for a system. The system 100 may be implemented in any other suitable manner without departing from the scope of this disclosure. The management stations are configured to provide overall control and monitoring of automation devices, field devices, and other devices of the system 100. One or more management stations of the system 100 include one or more processors 112, one or more input components 114, and one or more output components 116.

For the illustrated embodiment of FIG. 1, the system 100 provides connectivity based on one or more communication protocols to one or more devices and/or subsystems for various building parameters. Although not required, examples of subsystems include, but are not limited to, a security subsystem 118 and/or another subsystem 120, such as an environmental/comfort subsystems, a fire safety subsystem, and the like. Each subsystem 118, 120 may include various types of automation controllers and field devices 124, 126 ("automation controllers") for monitoring and controlling areas within a building or group of buildings. Examples of automation controllers and field devices 124, 126 include, but are not limited to, access control devices, video surveillance devices, security monitoring sensors and devices, and the like. These automation controllers and field devices 124, 126 may communicate via one or more communication protocols, such as BACnet, KNX, Lon Works, Modbus, and the like.

The system 100 includes access control devices for managing occupant access to one or more access-controlled doors or portals 130 of a facility. An access-controlled door 130 includes one or more movable barriers 132 and a door frame 134 to support the barrier(s) as the barrier opens and close. The access-controlled door 130 also includes a secure mechanism 136, such as a locking mechanism, to maintain the barrier locked or release/allow the barrier to open. The access-controlled door 130 further includes one or more control panels 106, and 108, and door devices 138, 140, 142, corresponding to the movable barrier(s). The door devices may include a first door contact sensor 138 corresponding to the movable barrier and a second door contact sensor 140 corresponding to the door frame 134. Examples of door devices include, but are not limited to, a request to exit button 142, a card reader 144, an emergency door release 146, a door handle/bar 148, and the like. The control panels 106, 108 of the access-controlled door include electrical circuits for communicating signals to the managements station 104. For some embodiments, the access-controlled door may include communication box communicating between the door devices 142, 144, 146, 148 and the controllers and management station 106, 108, 104 via wired or wireless link.

Figure 2:
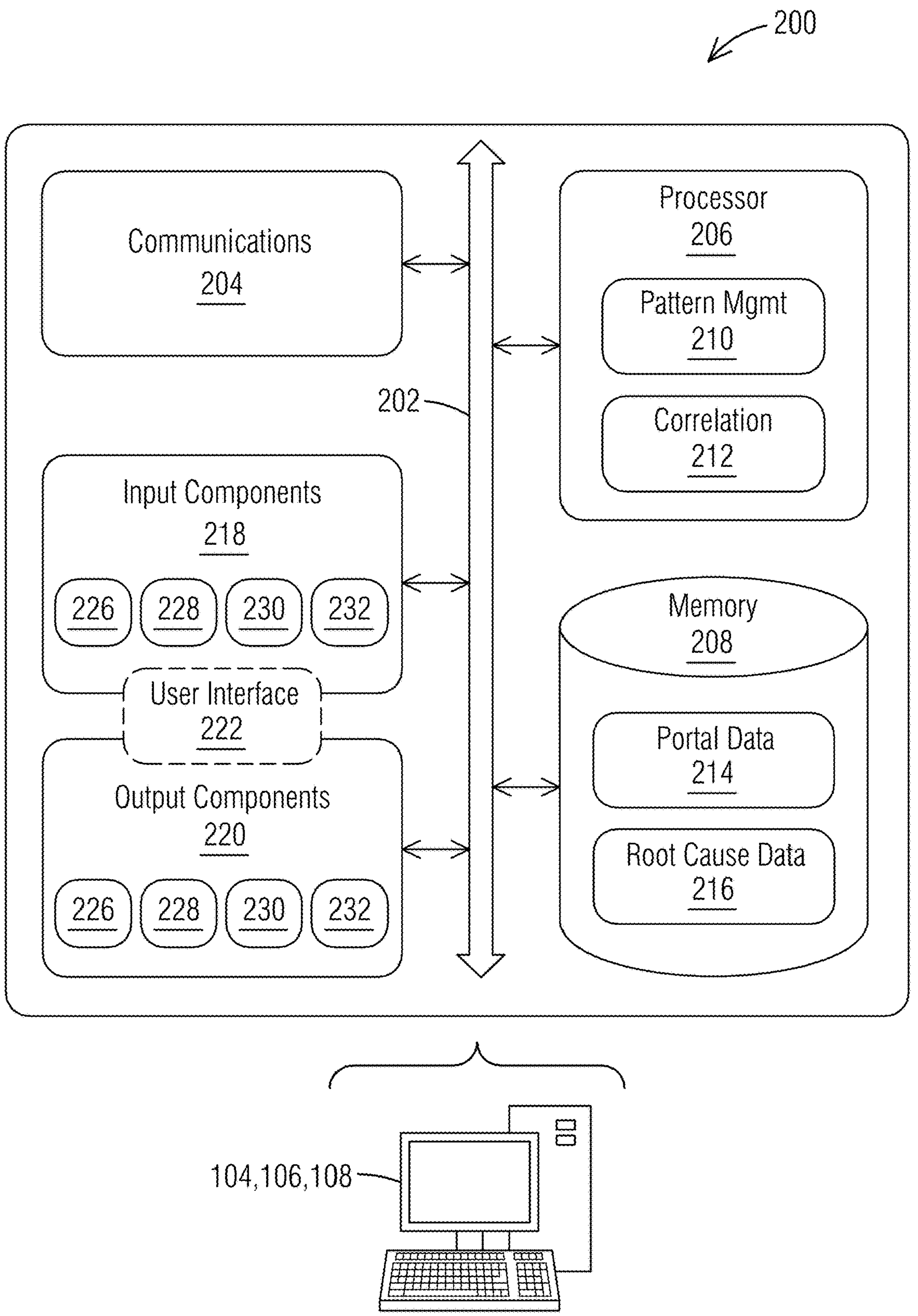
FIG. 2 is a block diagram of a management station of FIG. 1 in an example implementation.

Referring to FIG. 2, there is shown a management station and controllers 104, 106, 108 in an example implementation. The system components 200 comprise one or more communication lines 202 for interconnecting other system components directly or indirectly. The other system components include one or more communication components 204 communicating with other entities via a wired or wireless network, one or more processors 206, and one or more memory components 208. The communication component 204 communicates (i.e., receives and/or transmits) data associated with one or more devices of the system 100 and its associated devices, such as the access-controlled door 130 and its various components 132-148. The communication component 204 may utilize wired or wireless technology for communication. Examples of wireless communication technologies include, but are not limited to, Bluetooth (including BLE), ultrawide band (UWB), Wi-Fi (including Wi-Fi Direct), Zigbee, cellular, mesh networks, PAN, WPAN, WAN, near-field communications, and other types of radio communications and their variants.

The processor or processors 206 may send data to, and process commands received from, other components of the system components 200, such as information of the communication component 204 or the memory component 208. Each application includes executable code to provide specific functionality for the processor 206 and/or remaining components of the management station and controllers 104, 106, 108. Examples of applications executable by the processor 206 include, but are not limited to, a pattern management module 210 and a correlation module 212. The pattern management module 210 of the processor 206 identifies possible alarm patterns based on the door data received from the access-controlled door. The correlation module 212 of the processor 206 correlates the alarm patterns identified by the pattern management module 210 together with one or more door data. Examples of door data include, but are not limited to, remote device states, software & field device configuration settings, door access statistical information and then maps these to their corresponding possible root causes.

Data stored at the memory component 208 is information that may be referenced and/or manipulated by a module of the processor 206 for performing functions of the management station and controllers 104, 106, 108. Examples of data associated with the management station and controllers 104, 106, 108 and stored by the memory component 208 may include, but are not limited to, door data 214 and root cause data 216. The door data 214 is a collection of the various signals received from the access-controlled door or processed version of these signals. Examples of door data include, but are not limited to, event and alarm messages with corresponding time stamps and duration times, remote device states, software & field device configuration settings, and door access statistical information. The root cause data 216 includes known types of possible root causes associated with false alarms that are not considered to be security hazards. Examples of root cause data 216 include, but are not limited to configuration drift, faulty or damaged system components or devices, aging infrastructure, environmental conditions and equipment misuse, which distinguish from alarms of security hazards due to malicious acts (i.e., breaking in, etc.). Examples of faulty equipment include, but are not limited to, door/door frame misalignment (misaligned door contacts), door lock faults/malfunctions, door closing mechanism faults/malfunctions, and the like. Examples of equipment misuse include, but are not limited to, blocked door, break glass during non-emergency, held door (for others), and the like.

The system components 200 may include an input component 218 that manages one or more input components and/or an output component 220 that manages one or more output components. The input components 218 and output components 220 of the system components 200 may include one or more visual, audio, mechanical, and/or other components. For some embodiments, the input and output components 218, 220 may include a user interface 222 for interaction with a device. The user interface 222 may include a combination of hardware and software to provide a user with a desired user experience.

It is to be understood that FIG. 2 is provided for illustrative purposes only to represent an example implementation of the management station 104 and is not intended to be a complete diagram of the various components that may be utilized by the device. The management station 104, may include various other components not shown in FIG. 2, may include a combination of two or more components, or a division of a particular component into two or more separate components, and still be within the scope of the present invention. Also, the components 200 may be coupled directly or indirectly to each other to perform the operations of the management station 104. For example, the processor 206 may be coupled, directly or indirectly, to the input component 218. Likewise, the output component 220 may be coupled, directly or indirectly, to the processor 206.

Figure 3:
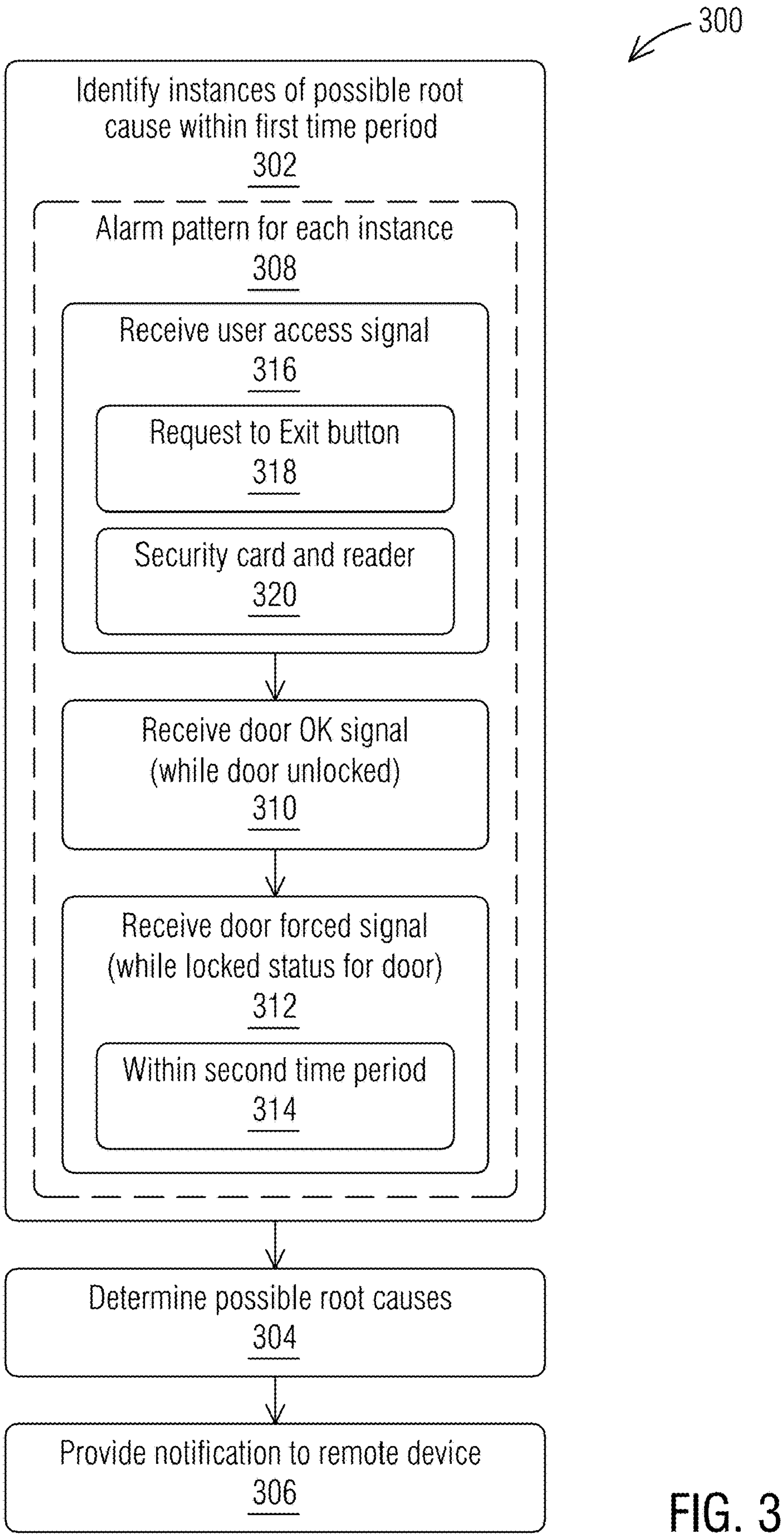
FIG. 3 is a flow diagram of an operation of the management station of FIG. 1 in an example implementation.

Referring to FIG. 3, there is shown an operation 300 of the management station 104, in an example implementation. The operation 300 represents a method of a security system for false alarm detection and diagnostics. The pattern management module 210 of the processor 206 identifies (302) one or more instances of an alarm at an access-controlled door within a predetermined time period. The correlation module 212 of the processor 206 correlates the alarm patterns identified by the pattern management module 210 together with remote device states, software & field device configuration settings, door access statistical information and then maps these to their corresponding possible root causes. The communication component 204 of the output component provides (306) to a remote device a notification including the possible root cause that distinguishes from a security hazard.

When identifying (302) the instances of the possible root cause at an access-controlled door within a predetermined time period, each instance analyzed (308) by the pattern management module 210 of the processor 206 may include an alarm pattern. A "Door OK" signal soon followed by a "Door forced" signal may be received multiple times from a particular access-controlled door. The door ok signal is associated with closing of door contact sensors, and the door forced signal is associated with opening of the door contact sensors. The door ok signal and the door forced signal correspond to the same instance. For this reason, the door forced signal is received (314) within a second time period soon after receiving the door ok signal in order to be considered the same instance. The second time period may vary based on the setup of the access-controlled door, but it is associated with a period of time appropriate to allow a person to pass through the door. For example, the second time period may be less than 5 seconds, less than 10 seconds, or less than 30 seconds.

For some embodiments, the pattern management module 210 may receive, (310) the door ok signal while the access-controlled door is unlocked. For some embodiments, the pattern management module 210 may receive (310, 316) the door ok signal while the access-controlled door is unlocked in response to the authorized user action. For some embodiments, the door forced signal may be associated with misalignment of the door contact sensors while the access-controlled door has a locked status. For some embodiments, the door forced signal is associated with misalignment of the door contact sensors without receiving the user access signal subsequent to receiving the door ok signal.

For some embodiments, for each alarm pattern (308), the pattern management module 210 may receive (316) a user access signal associated with an authorized user action at the access-controlled door. The authorized user action may be selection (318) of a request to exit button at the access-controlled door, detection (320) of a security card in proximity to or at a card reader of the access-controlled door, or both. For some embodiments the door forced signal may be associated with a malfunction at (318) request to exit sensor or it's communications medium.

Figure 4:
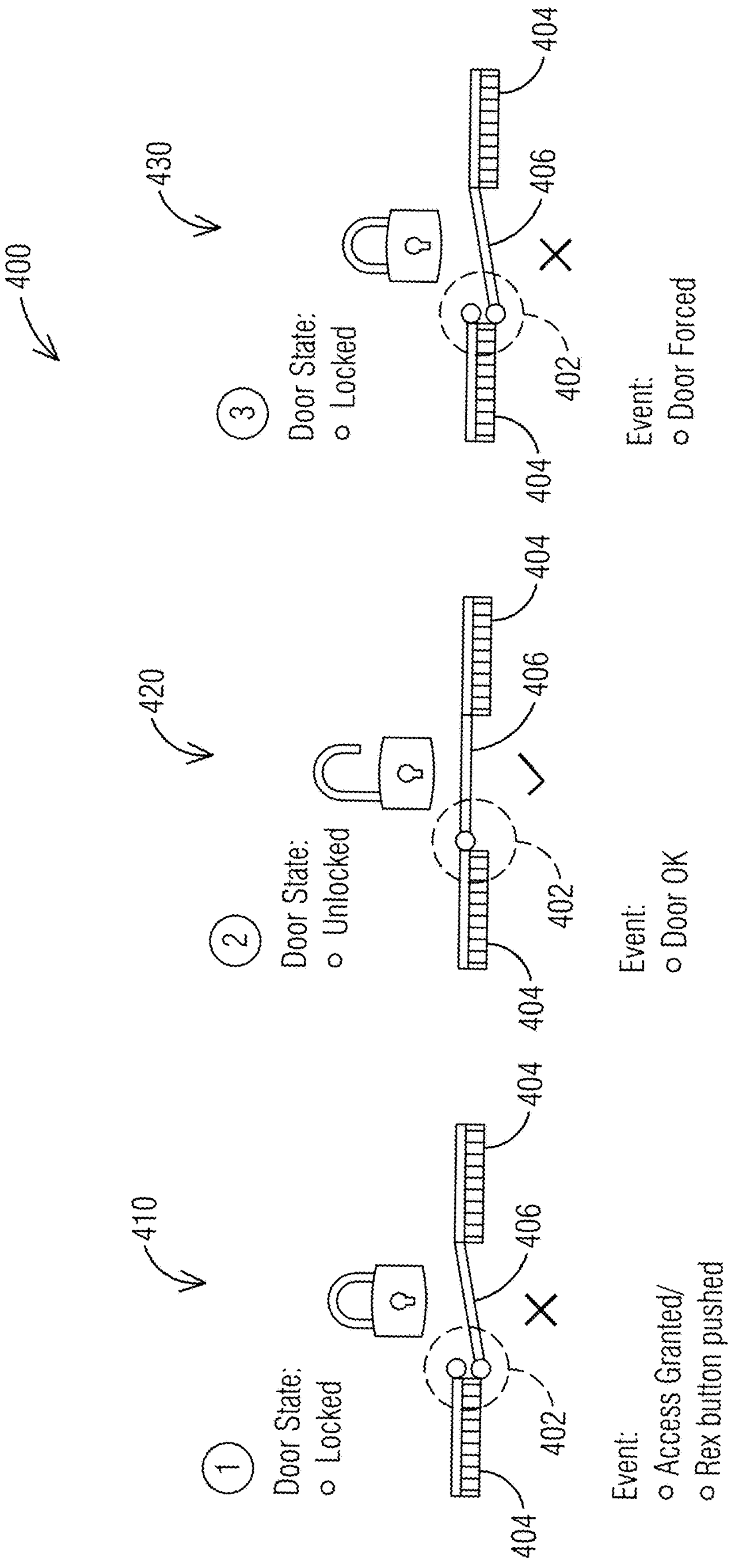
FIG. 4 depicts an example use case detected by the building management system of FIG. 1.

Referring to FIG. 4, there is shown an example use case of a door contact providing detected signals to the building management system. The door contact includes a first sensor of two sensors 402 (i.e., door contact) located on a door frame 404 and a second sensor of two sensors 402 located on a door leaf 406. The door contact 402 indicates a status of the door, whether open or closed. When properly setup, the door contact 402 provides a closed status signal to the system 100 when the sensors are aligned and an open status signal to the system when the contacts are not aligned. The example use case may be applied to any type of security system or building management system, such as the one shown in FIG. 1.

For the example represented by FIG. 4, the first and second sensors 402 are misaligned relative to each other. At a first stage (410), when the door leaf 406 is initially at a locked state, the door lock of the door holds the door leaf 406 at a position in which the sensors 402 of the door contact are not aligned. At some point thereafter, a building occupant may unlock the door for a second stage (420) of the use case. For example, the occupant may present a security card at a card reader near the door which activate an access signal to the system or activate a request to exit button near the door which activates a button pushed signal to the system. At this second stage (420), when the door is unlocked by the occupant action, the door may be released and the door leaf (406) may move slightly relative to the door frame (404). As a result, the first sensor may align with the second sensor, and the door contact 402 provides a "Door OK" signal to the system 100.

At a third state (430) soon thereafter, after unlocking the door, the door lock of the door engages again. Since the door leaf 406 is once again misaligned relative to the door frame 404, a "Door forced" signal is provided to the system 100.

The above example use case illustrates how the system 100 may identify a possible root cause based on signal patterns observed by the sensors 402 for a particular door. The system 100 may distinguish a false alarm from a security concern based on a door forced signal being received within a short period of time after receiving a Door OK signal. Other indications which may further suggests this root cause include the Door OK signal being in response to a user activation, and/or multiple incidences of this signal pattern occurring within a monitoring period.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A security system for false alarm detection and diagnostics comprising:

a management station identifying at least one instance of an alarm at an access-controlled door within a predetermined time period and determining a possible root cause based on the at least one instance occurring within the predetermined time period, each instance including an alarm pattern comprising:

a first door forced signal, received from door contact sensors, associated with misalignment of the door contact sensors while the access-controlled door has a locked status;

a door ok signal, received from the door contact sensors subsequent to receiving the first door forced signal, the door ok signal being associated with alignment of the door contact sensors while the access-controlled door has an unlocked status, the door contact sensors transitioning from misalignment to alignment in response to disengaging a door lock of the access-controlled door; and a second door forced signal, received from the door contact sensors subsequent to receiving the door ok signal, the second door forced signal being associated with the misalignment of the door contact sensors while the access-controlled door has the locked status, the door contact sensors transitioning from alignment to misalignment in response to engaging the door lock of the access-controlled door; and a remote device receiving, from the management station, a notification including the possible root cause that distinguishes from a security hazard and recommendations for remediation.

2. The security system as described in claim 1, wherein the management station receives the second door forced signal within a second predetermined time period after receiving the door ok signal, the second time period being associated with a period of time appropriate to allow a person to pass through the door.

3. The security system as described in claim 1, wherein the management station receives a user access signal associated an authorized user action at the access-controlled door, the authorized user action including at least one of selecting a request to exit button of the access-controlled door or detecting security card in proximity at a card reader of the access-controlled door.

4. The security system as described in claim 3, wherein the management station receives the door ok signal while the access-controlled door is unlocked in response to the authorized user action.

5. The security system as described in claim 3, wherein the second door forced signal is associated with misalignment of the door contact sensors without receiving the user access signal subsequent to receiving the door ok signal.

6. A method of a security system for false alarm detection and diagnostics, the method comprising:

identifying at least one instance of an alarm at an access-controlled door within a predetermined time period, each instance including an alarm pattern comprising:

receiving a first door forced signal associated with misalignment of door contact sensors while the access-controlled door has a locked status;

receiving a door ok signal subsequent to receiving the first door forced signal, the door ok signal being associated with alignment of the door contact sensors while the access-controlled door has an unlocked status, the door contact sensors transitioning from misalignment to alignment in response to disengaging a door lock of the access-controlled door;

receiving a second door forced signal subsequent to receiving the door ok signal, the second door forced signal being associated with the misalignment of the door contact sensors while the access-controlled door has the locked status, the door contact sensors transitioning from alignment to misalignment in response to engaging the door lock of the access-controlled door;

determining a possible root cause based on the at least one instance occurring within the predetermined time period and correlating the alarm pattern with door data associated with the access-controlled door; and providing, to a remote device, a notification including the possible root cause that distinguishes from a security hazard and a recommendation for remediation.

7. The method as described in claim 6, wherein receiving the second door forced signal includes receiving the second door forced signal within a second predetermined time period after receiving the door ok signal, the second time period being associated with a period of time appropriate to allow a person to pass through the door.

8. The method as described in claim 6, further comprising:

receiving a user access signal associated an authorized user action at the access-controlled door, the authorized user action including at least one of selecting a request to exit button of the access-controlled door or detecting security card in proximity at a card reader of the access-controlled door.

9. The method as described in claim 8, wherein receiving the door ok signal includes receiving the door ok signal while the access-controlled door is unlocked in response to the authorized user action.

10. The method as described in claim 8, wherein the second door forced signal is associated with misalignment of the door contact sensors without receiving the user access signal subsequent to receiving the door ok signal.

11. A non-transitory computer readable medium including executable instructions which, when executed, causes at least one processor to detect and diagnose a false alarm of a security system by:

identifying at least one instance of an alarm at an access-controlled door within a predetermined time period, each instance of including an alarm pattern comprising:

receiving a first door forced signal associated with misalignment of door contact sensors while the access-controlled door has a locked status;

receiving a door ok signal subsequent to receiving the first door forced signal, the door ok signal being associated with alignment of door contact sensors while the access-controlled door has an unlocked status, the door contact sensors transitioning from misalignment to alignment in response to disengaging a door lock of the access-controlled door;

receiving a second door forced signal subsequent to receiving the door ok signal, the second door forced signal being associated with the misalignment of the door contact sensors while the access-controlled door has the locked status, the door contact sensors transitioning from alignment to misalignment in response to engaging the door lock of the access-controlled door; and determining a possible root cause based on the at least one instance occurring within the predetermined time period and correlating the alarm pattern with door data associated with the access-controlled door; and providing, to a remote device, a notification including the possible root cause that distinguishes from a security hazard and a recommendation for remediation.

12. The non-transitory computer readable medium as described in claim 11, wherein receiving the second door forced signal includes receiving the second door forced signal within a second predetermined time period after receiving the door ok signal, the second time period being associated with a period of time appropriate to allow a person to pass through the door.

13. The non-transitory computer readable medium as described in claim 11, further comprising:

receiving a user access signal associated an authorized user action at the access-controlled door, the authorized user action including at least one of selecting a request to exit button of the access-controlled door or detecting security card in proximity at a card reader of the access-controlled door.

14. The non-transitory computer readable medium as described in claim 13, wherein the second door forced signal is associated with misalignment of the door contact sensors without receiving the user access signal subsequent to receiving the door ok signal.

* * * * *